US012801891B2

(12) United States Patent
Fang et al.

(10) Patent No.: US 12,801,891 B2
(45) Date of Patent: Nov. 17, 2026

(54) OBJECT PROCESSING METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Jiarui Fang, Shenzhen (CN); Yang Yu, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1093 days.

(21) Appl. No.: 17/949,375

(22) Filed: Sep. 21, 2022

(65) Prior Publication Data

US 2023/0030265 A1 Feb. 2, 2023

Related U.S. Application Data

(63) Continuation of application No. PCT/CN2021/104963, filed on Jul. 7, 2021.

(30) Foreign Application Priority Data

Aug. 10, 2020 (CN) ......................... 202010797865.0

(51) Int. Cl.
*G06N 3/04* (2023.01)
*G06N 3/08* (2023.01)

(52) U.S. Cl.
CPC ................. *G06N 3/04* (2013.01); *G06N 3/08* (2013.01)

(58) Field of Classification Search
CPC ........ G06N 3/045; G06N 3/0455; G06N 3/04; G06N 3/08; G06N 5/046
See application file for complete search history.

(56) References Cited

U.S. PATENT DOCUMENTS 10,083,395 B2 * 9/2018 Young ...................... G06N 3/08
10,402,691 B1 * 9/2019 Abdi Taghi Abad ........................ G06F 18/2148

(Continued)

FOREIGN PATENT DOCUMENTS

CN 106503791 A 3/2017
CN 107454965 A 12/2017

(Continued)

OTHER PUBLICATIONS

Sam McCandlish et al., An Empirical Model of Large-Batch Training, (Year: 2018).*

(Continued)

*Primary Examiner* — Lewis A Bullock, Jr.
*Assistant Examiner* — Carlos Alberto Espana
(74) *Attorney, Agent, or Firm* — Crowell & Moring LLP

(57) ABSTRACT

This application discloses an object processing method and apparatus, a computer readable storage medium, and an electronic device. The method includes: grouping objects in an object set to obtain a plurality of grouping combinations; determining, from the plurality of grouping combinations, a target grouping combination that consumes a minimum resource; a resource consumed by each grouping combination in the plurality of grouping combinations comprising: a sum of resources consumed by inputting each group in the each grouping combination to a neural network model for processing; and inputting in batches each group in the target grouping combination to the neural network model for processing.

18 Claims, 5 Drawing Sheets

(56) References Cited

U.S. PATENT DOCUMENTS

| | | | | |
|---|---|---|---|---|
| 10,467,529 | B2 * | 11/2019 | Lin | G06N 3/0895 |
| 10,769,533 | B2 * | 9/2020 | Fougner | G06N 3/08 |
| 2016/0342890 | A1 * | 11/2016 | Young | G06N 3/0464 |
| 2019/0026624 | A1 * | 1/2019 | Steiner | G06N 3/084 |
| 2019/0251418 | A1 | 8/2019 | Nakanishi et al. | |
| 2020/0125926 | A1 * | 4/2020 | Choudhury | G06N 3/0499 |
| 2020/0226453 | A1 * | 7/2020 | Luk | G06N 3/08 |
| 2021/0158083 | A1 * | 5/2021 | Gan | G06N 3/02 |
| 2022/0121942 | A1 * | 4/2022 | Seow | G06N 3/045 |

FOREIGN PATENT DOCUMENTS

| | | | |
|---|---|---|---|
| CN | 110334801 | A | 10/2019 |
| CN | 110689121 | A | 1/2020 |
| CN | 110780985 | A | 2/2020 |
| CN | 110795228 | A | 2/2020 |
| CN | 110929623 | A | 3/2020 |
| CN | 111275175 | A | 6/2020 |
| CN | 111898698 | A | 11/2020 |

OTHER PUBLICATIONS

International Search Report and Written Opinion for International Patent Application No. PCT/CN2021/104963 dated Oct. 12, 2021, 14 pages.

Chinese Office Action for Chinese Patent Application No. CN202010797865.0 dated Apr. 22, 2021, 8 pages.

Qiang-Da Yang, et al., "Simultaneous Series Hybrid Modeling for Fermentation Process Based on Improved Particles Swarm Optimization", Journal: ACTA Automatica Sinica, vol. 41, No. 3, Mar. 15, 2015.

* cited by examiner

OBJECT PROCESSING METHOD AND APPARATUS, STORAGE MEDIUM, AND ELECTRONIC DEVICE

RELATED APPLICATION

This application is a continuation application of PCT Patent Application No. PCT/CN2021/104963, filed on Jul. 7, 2021, which claims priority to Chinese Patent Application No. 202010797865.0, filed with the China National Intellectual Property Administration, PRC on Aug. 10, 2020, each of which is incorporated herein by reference in its entirety.

FIELD OF THE TECHNOLOGY

This application relates to the computer field, and specifically, to an object processing method and apparatus, a computer readable storage medium, and an electronic device.

BACKGROUND OF THE DISCLOSURE

In a production scenario, a deep learning technology that takes a neural network as a core needs to be supported by an efficient service software framework. A plurality of requests are packaged into one batch to perform reasoning calculation, so as to give full play to a calculation capability of a processor. Batch processing optimization is an optimization technique at a server side. Messages arriving at the server in a time interval are packaged into one batch, and forward calculation is performed on it by using a neural network. In this way, a throughput of a service can be improved by improving calculation efficiency. Currently, a service framework for deep learning is designed for input requests with the same processing size, that is, each input request is equal-sized data. An algorithm of a batch scheduler is also simple. The batch scheduler combines all request data in a period of time to form a batch.

In the related technology, batch scheduling is based on input data of the same scale, and input data of different sizes is packaged into one batch, which causes a problem of a high overhead. Currently, there is no effective solution.

SUMMARY

Embodiments of this disclosure provide an object processing method and apparatus, a computer readable storage medium, and an electronic device, so as to resolve at least a technical problem in the related art that batch scheduling is based on input data of the same scale, and input data of different sizes is packaged into one batch, which has a high overhead.

An embodiment of this disclosure provides an object processing method, including: performing batch processing on target objects in a target object set to obtain a plurality of grouping combinations;

determining, from the plurality of grouping combinations, a target grouping combination that consumes the minimum resource;

a resource consumed by each grouping combination in the plurality of grouping combinations including: a sum of resources consumed by inputting in batches a plurality of batches of target objects included in each grouping combination to a target neural network model for processing; and inputting in batches a plurality of batches of target objects included in the target grouping combination to the target neural network model for processing.

An embodiment of this disclosure provides an object processing apparatus, including: a batch operation module, configured to perform batch processing on target objects in a target object set to obtain a plurality of grouping combinations;

a determining module, configured to determine, from the plurality of grouping combinations, a target grouping combination that consumes the minimum resource; a resource consumed by each grouping combination in the plurality of grouping combinations including: a sum of resources consumed by inputting in batches a plurality of batches of target objects included in each grouping combination to a target neural network model for processing; and an input module, configured to input in batches a plurality of batches of target objects included in the target grouping combination to the target neural network model for processing.

An embodiment of this disclosure provides a computer readable storage medium, where the computer readable storage medium stores a computer program, and the computer program is configured to perform the foregoing object processing method when running.

An embodiment of this disclosure provides an electronic device, including a memory and a processor, where the memory stores a computer program, and the processor is configured to perform the foregoing object processing method by using the computer program.

In the embodiments of this application, a target grouping combination that consumes a minimum resource is determined in a plurality of grouping combinations, and is inputted in batches to a target neural network model for processing, so that a target neural network consumes a minimum resource when processing a target object, thereby achieving technical effects of reducing resource consumption and overheads.

DESCRIPTION OF EMBODIMENTS

To enable a person skilled in the art to understand the solutions in this application more clearly, the following clearly and fully describes the technical solutions in the embodiments of this application with reference to the drawings hereof. Apparently, the described embodiments are merely a part of but not all of the embodiments of this application. All other embodiments derived by a person of ordinary skill in the art based on the embodiments of the present disclosure without making any creative effort fall within the protection scope of the present disclosure.

The terms such as "first" and "second" in the specification, claims, and drawings of this application are intended to distinguish between similar items, but not to indicate a specific order or sequence. It is to be understood that the data termed in such a way is interchangeable in proper circumstances, so that the embodiments of this application described herein can be implemented in other sequences than the sequence illustrated or described herein. Further, the terms "include", "comprise", "possess", and any variations thereof, are intended to cover non-exclusive inclusion. For example, a process, method, system, product, or device that includes or comprises a series of steps or units is not necessarily limited to the expressly enumerated steps or units, but may include other steps or units that are not expressly enumerated or that are inherent to the process, method, product, or device.

With application of deep learning in different fields, for example, natural language processing (NLP), image processing, and audio and video fields, fast processing of a neural network is facing a great challenge. Input data inputted to the neural network is constantly changed in size. For example, sentences of different lengths, images of different pixel sizes, audio and video files of different sizes are inputted, which is referred to as a variable input size deep learning service process. This makes a batch scheduler algorithm previously designed for an input size invariant service inapplicable. Using text information of different character lengths as an input example, if a plurality of texts of different character lengths are packaged into one batch, a text of a relatively short character length in the batch needs to padded with zeros to reach a size of the longest text. Because the zero-added part needs to participate in invalid calculation, much additional calculation is introduced.

Therefore, input data of different size is packaged into one batch, which causes a problem of a high overhead.

To resolve the foregoing problem, an embodiment of this disclosure provides an object processing method, so that a target neural network consumes a minimum resource when processing a target object, thereby implementing technical effects of reducing resource consumption and reducing overheads. In an implementation, the object processing method may not be limited to an environment shown in FIG. 1.

Figure 1:
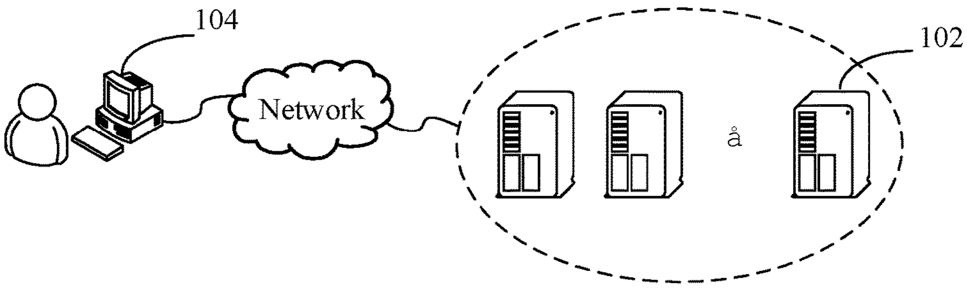
FIG. 1 is a schematic diagram of an exemplary application environment of an object processing method according to an embodiment of this disclosure.

As shown in FIG. 1, a terminal 104 may be a terminal configured with a target client and may include, but is not limited to, at least one of the following: a cell phone (such as an Android phone, an iOS phone, and the like), a notebook computer, a tablet computer, a palmtop computer, a mobile Internet device (MID), a PAD, a desktop computer, a smart TV, and the like. The foregoing client may be a game client, a video client, an instant messaging client, a browser client, an education client, or the like. The network may include, but is not limited to, a wired network and a wireless network. The wired network includes: a local area network, a metropolitan area network, and a wide area network. The wireless network includes: Bluetooth, Wi-Fi, and another network implementing wireless communication. The server 102 may be an independent server, a server cluster consisting of multiple servers, or a cloud server. The above is merely an example, and constitutes no limitation on this embodiment of this disclosure.

In some embodiments, that an electronic device used for object processing performs the object processing method provided in this embodiment of this disclosure is used as an example of an application scenario in which the terminal 104 (the electronic device used for object processing) performs object processing. The terminal 104 locally performs the object processing method provided in this embodiment of this disclosure. A target grouping combination that consumes a minimum resource is determined in a plurality of grouping combinations (may also be referred to as grouping combinations), and a plurality of batches of target objects included in the target grouping combination are inputted in batches to a target neural network model for processing, so that a grouping combination that consumes a minimum resource is selected from a plurality of grouping combinations as input to the target neural network, and the target neural network consumes a minimum resource when processing the target object. For example, an instant messaging client is installed on the terminal 104, and various texts in communication are acquired by using the instant messaging client, so as to form a text set, perform batch operation on the texts in the text set to obtain a plurality of grouping combinations, determine, in the plurality of grouping combinations, a target grouping combination that consumes a minimum resource, and input in batches a plurality of batches of texts included in the target grouping combination to the target neural network model for processing, so that the target neural network consumes a minimum resource when processing the text set, so as to reduce overheads caused by input data of different sizes.

In some embodiments, the terminal 104 may also send, to the server 102 on the cloud by using a network, input requests for processing different sizes. The user enters a target object set of target objects of different sizes on the terminal 104. The terminal 104 automatically generates input requests for processing different sizes (including a target object set of target objects of different sizes, and invokes, based on an object processing function (encapsulated object processing program) provided by the server 102 for processing input requests of different sizes. The server 102 determines, by using the object processing method provided in this embodiment of this disclosure, a target grouping combination that consumes a minimum resource from a plurality of grouping combinations, and input in batches a plurality of batches of target objects included in the target grouping combination to a target neural network model for processing, so that a grouping combination that consumes a minimum resource is selected from a plurality of grouping combinations as input to the target neural network, and the target neural network consumes a minimum resource when processing the target object. For example, an instant messaging client is installed on the terminal 104, and various texts in communication are acquired by using the instant messaging client, so as to form a text set, input requests for processing different sizes are automatically generated, and the input requests for processing different sizes are sent to the server 102. After receiving the input requests for processing different sizes, the server 102 parses the input requests for processing different sizes to obtain a target object set that includes target objects of different sizes, performs batch operation on the texts in the text set to obtain a plurality of grouping combinations, determines, in the plurality of grouping combinations, a target grouping combination that consumes a minimum resource, and inputs in batches a plurality of batches of texts included in the target grouping combination to the target neural network model for processing, so that the target neural network consumes a minimum resource when processing the text set, so as to reduce overheads caused by input data of different sizes.

Figure 2:
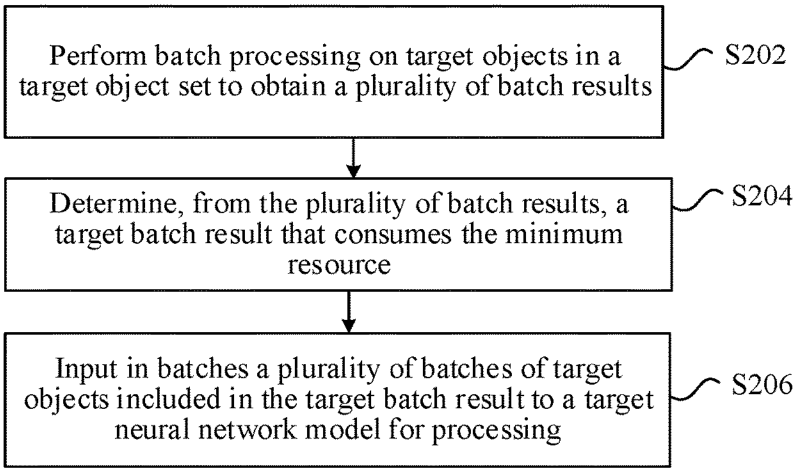
FIG. 2 is a flowchart of an object processing method according to an embodiment of this disclosure.

In some embodiments, as shown in FIG. 2, the foregoing object processing method includes the following steps:

Step S202: Perform batch processing on target objects in a target object set to obtain a plurality of grouping combinations.

Step S204: Determine, from the plurality of grouping combinations, a target grouping combination that consumes the minimum resource; a resource consumed by each grouping combination in the plurality of grouping combinations including: a sum of resources consumed by inputting in batches a plurality of batches of target objects included in each grouping combination to a target neural network model for processing.

Step S206: Input in batches a plurality of batches of target objects included in the target grouping combination to a target neural network model for processing.

Figure 3:
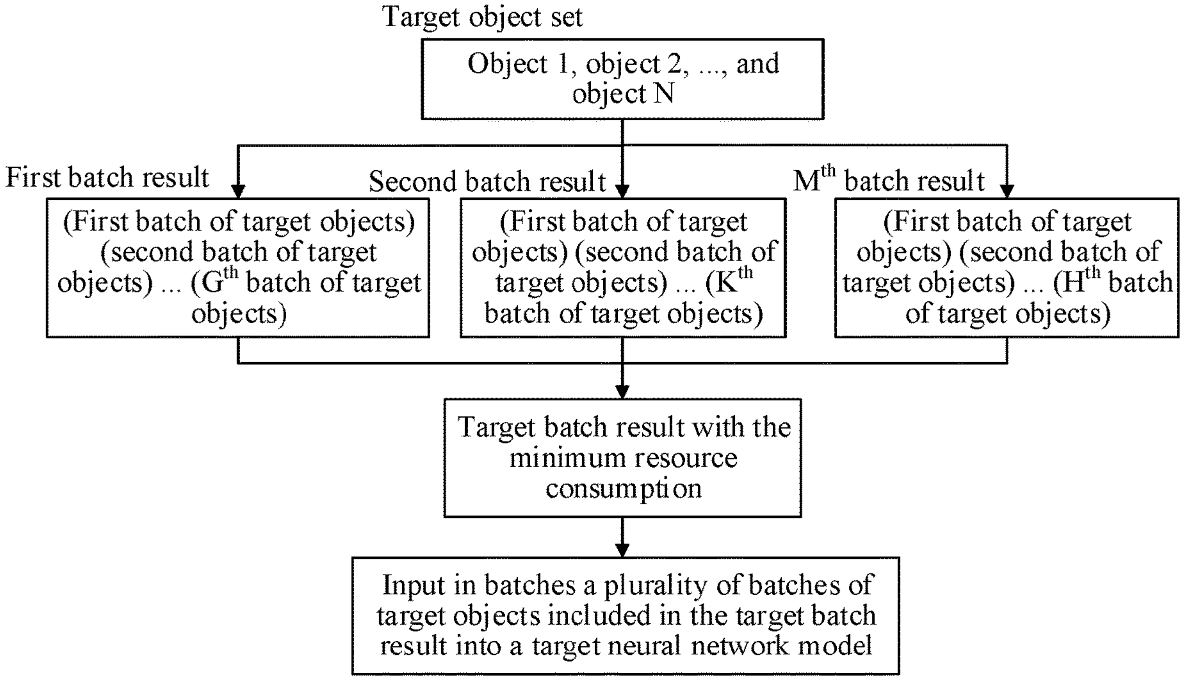
FIG. 3 is an overall flowchart according to an embodiment of this disclosure.

In an implementation, FIG. 3 is an overall flowchart according to an embodiment of this disclosure. In this disclosure, a group of objects may also be referred to as a batch of objects. The target object set includes an object 1, an object 2, . . . , an object N, and the like. A value of N may be determined according to an practical situation. For example, when the target object set includes 1000 target objects, the value of N is 1000. When the target object set includes 2000 target objects, the value of N is 2000. The plurality of target objects included in the target object set are grouped or batched to obtain a plurality of grouping combinations, for example, a first grouping combination, a second grouping combination, . . . , and an $M^{th}$ grouping combination. M is less than N. Each grouping combination includes a plurality of groups (or batches) of target objects. For example, the first grouping combination includes the first group (or batch) of target objects, the second group (or batch) of target objects, and a $G^{th}$ group (or batch) of target objects. G is a natural number. Each group (or batch) of target objects may include one target object, or may include a plurality of target objects. For example, the first group of target objects may include only an object 1, or may include an object 1 and an object 2, or may include an object 1, an object 2, and an object 3. A grouping combination of an object set refers to a combination of groups, each group includes one or more objects from the object set, and there is no overlapping between groups. Note that for an object set, there may be multiple grouping combinations, as the first grouping combination, the second grouping combination, the $M^{th}$ grouping combination, as described above. Each grouping combination may include multiple groups, and each group may include one or more objects. Each grouping combination as a whole includes all the objects in the object set. In this embodiment of this disclosure, resources consumed by each grouping combination in the neural network model are different. In a manner of determining, from the plurality of grouping combinations, the target grouping combination that consumes the minimum resource as data input to the target neural network model, a resource saving effect can be achieved.

Figure 4A:
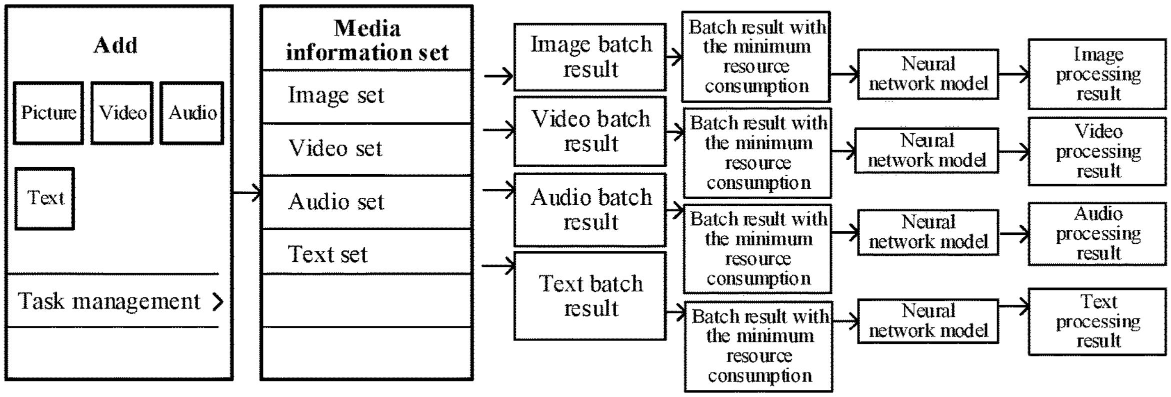
FIG. 4A and FIG. 4B are a schematic flowchart of processing a target object according to an embodiment of this disclosure.
Figure 4B:
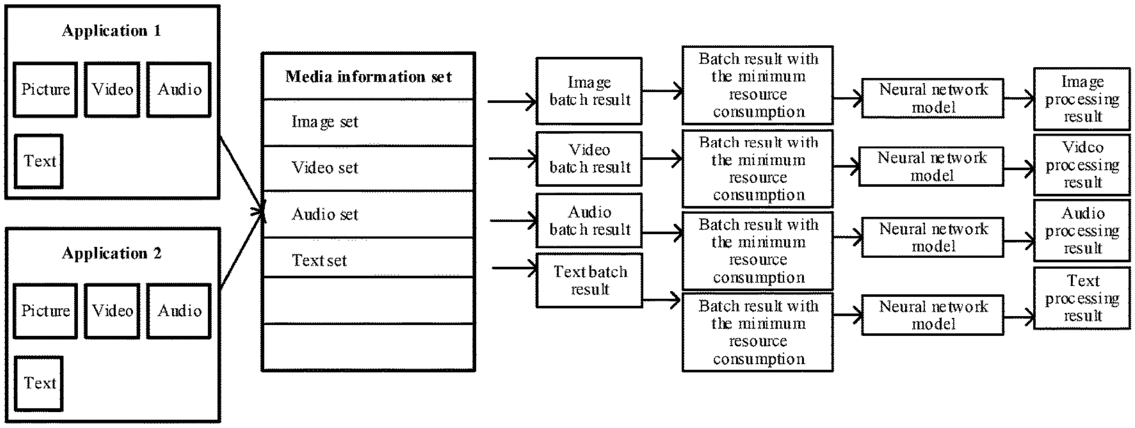

In an implementation, the target object included in the target object set may be media information, and the media information may be a text, an image, audio, a video, or the like. The text, image, video, and audio information may be obtained from an application program installed on the terminal, and the application program may be an instant messaging client, a game client, an education client, a video client, a music client, or the like. FIG. 4A and FIG. 4B are a schematic flowchart of processing a target object according to an embodiment of this disclosure. As shown in FIG. 4A, in this embodiment of this disclosure, text, image, video, and audio information may be acquired from the same client, and a batch operation (i.e., grouping operation) may be separately performed on a collected text set, image set, video set, and audio set to obtain corresponding grouping combinations, and obtain a corresponding grouping combination (or batch result) that consumes the minimum resource, and input a plurality of batches of target objects included in the minimum grouping combination to the neural network model to obtain a corresponding processing result outputted from the neural network model. As shown in FIG. 4B, in this embodiment of this disclosure, text, image, video, and audio information may be further acquired from different clients, text, image, video, and audio information may be acquired from an application 1, and text, image, video, and audio information may be acquired from an application 2, so that a text set, an image set, a video set, and an audio set are collected from the application 1 and the application 2, a batch operation is separately performed on the collected text set, image set, video set, and audio set to obtain corresponding grouping combinations, a corresponding grouping combination that consumes the minimum resource is obtained, and a plurality of target objects included in the minimum grouping combination are inputted to the neural network model to obtain a corresponding processing result outputted from the neural network model.

Figure 5:
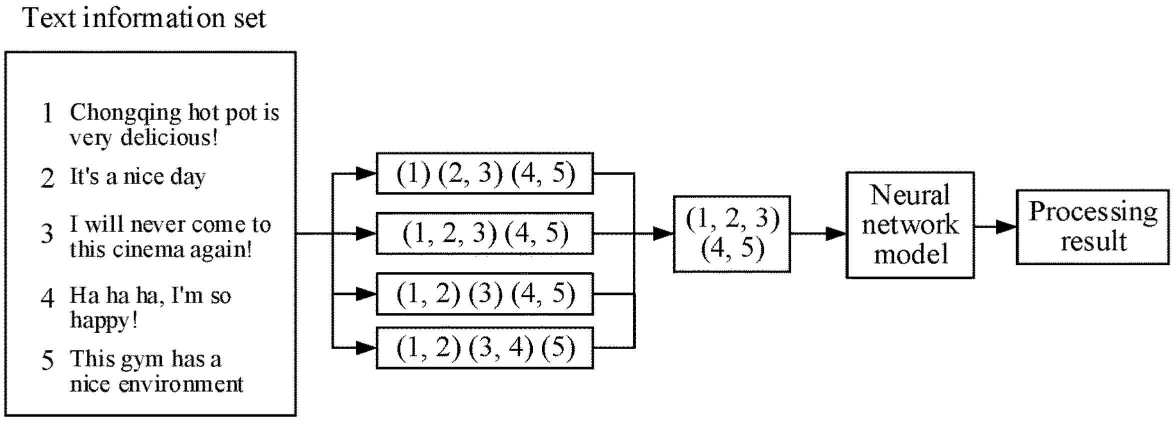
FIG. 5 is a schematic diagram of text information processing according to an embodiment of this disclosure.

In an implementation, FIG. 5 is a schematic diagram of text information processing according to an embodiment of this disclosure. A text may be acquired from a client shown in FIG. 5, and the client that acquires the text may be an instant messaging client. Characters included in different texts (or sentence, phrases) are different in length. For example, characters included in two texts in FIG. 5, "Chongqing hot pot is very delicious" and "It's a nice day" are different in length. When texts of different character lengths are processed by using a neural network model, resources consumed are different. An acquired text in the client may be represented by using an identifier, and the identifier may be a sequence number. As shown in FIG. 5, identifiers 1, 2, 3, 4, and 5 are respectively used for representing acquired texts. The identifier may also be a length of a text, for example, a character length of "Chongqing hot pot is very delicious" is 6, and 6 may be used for representing "Chongqing hot pot is very delicious". In this embodiment of this disclosure, the acquired texts may be grouped/batched in a plurality of manners, for example, (1) (2, 3) (4, 5), (1, 2, 3) (4, 5), (1, 2) (3) (4, 5), (1, 2) (3, 4), (5), and the like shown in FIG. 5. The first grouping combination includes 3 groups: (1), (2, 3), and (4, 5). The second grouping combination includes 2 groups: (1, 2, 3), and (4, 5). The grouping combinations shown in FIG. 5 are merely used as an example for description, and may further include other grouping combinations or grouping options. If the grouping combination (1, 2, 3) (4, 5) consumes the minimum resource in this batch manner, texts corresponding to mark numbers 1, 2, and 3 are used as one batch (group), and texts corresponding to mark number 4 and 5 are used as the other batch. According to this batch manner, the texts corresponding to the mark numbers 1, 2, and 3 and the texts corresponding to the mark numbers 4 and 5 are sequentially inputted to the neural network model to obtain processing results of the texts from the neural network model.

Figure 6:
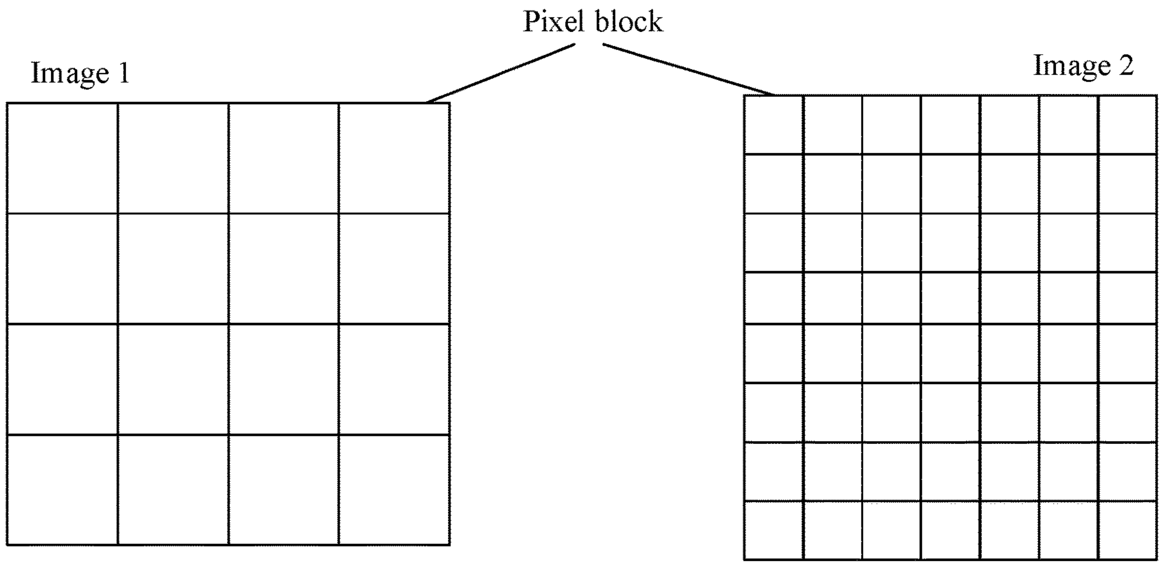
FIG. 6 is a schematic diagram of an image pixel according to an embodiment of this disclosure.

In an implementation, for an image, quantities of pixels or pixel blocks included in images of different sizes are different. FIG. 6 is a schematic diagram of an image pixel according to an embodiment of this disclosure. FIG. 6 shows images of two different pixel sizes, where each small grid represents one pixel or one pixel block. Because pixel sizes of images 1 and 2 are different, a target neural network model consumes different resources when processing the two images. For a video, factors such as a quantity of image frames included in the video and a size of an image pixel affect a size of a video file. For audio, factors such as a size of the audio data included in the audio, an audio format, and the like affect a size of an audio file. The target neural network model consumes different resources when processing audio or video files of different sizes.

Figure 7:
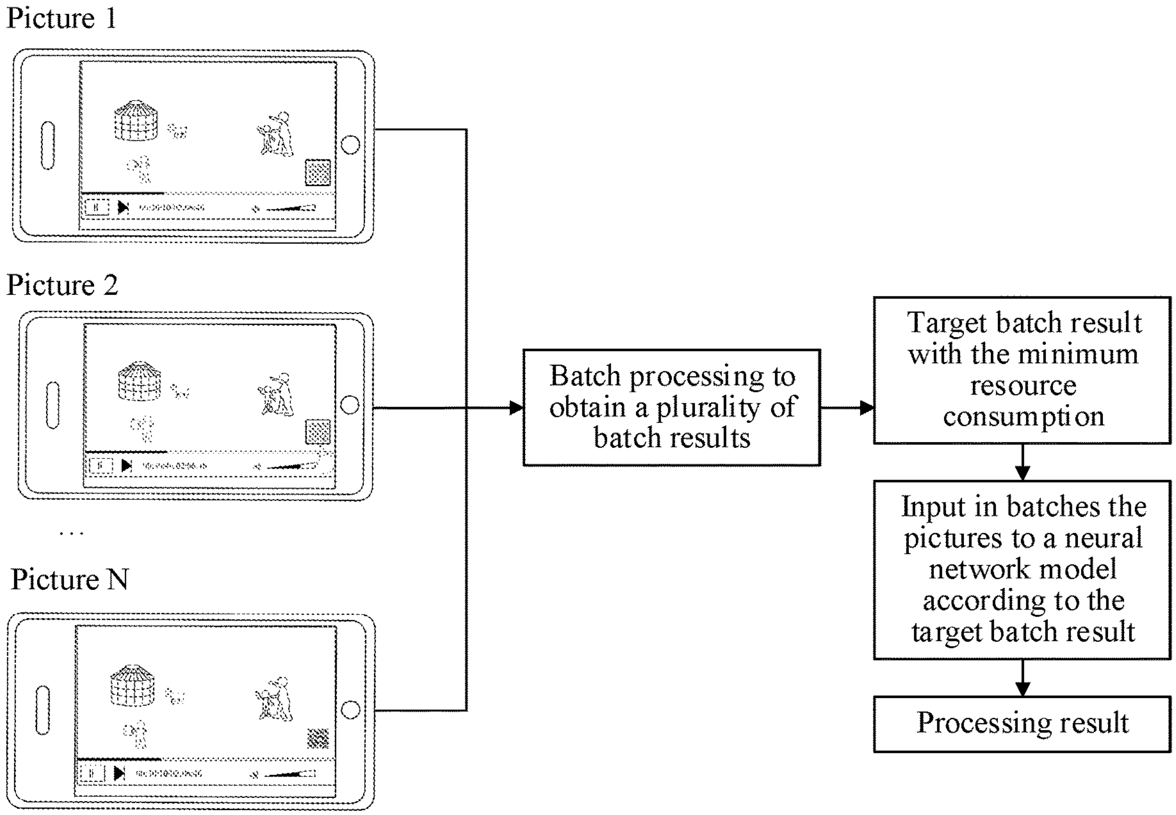
FIG. 7 is a schematic diagram of image information processing according to an embodiment of this disclosure.

In this embodiment of this disclosure, an image may be acquired by using a client shown in FIG. 7. The client that acquires the image may be an instant messaging client, may be a game client, or may be a video client, or may be an education client, or another client that includes an image, and different images include different pixels. FIG. 7 is a schematic diagram of image information processing according to an embodiment of this disclosure. That a picture in FIG. 7 is a game scenario presented by a game client is used as an example. Because pixels of different game pictures are different, acquired images are processed in batches to obtain a plurality of different grouping combinations, and a grouping combination that consumes the minimum resource is used as input to a neural network model to obtain a processing result.

In some embodiments, the performing batch processing on target objects in the target object set to obtain a plurality of grouping combinations includes: acquiring an $N^{th}$ target object in the target object set and an $(N-i)^{th}$ grouping combination; the target object set including N target objects, the $(N-i)^{th}$ grouping combination being a grouping combination that consumes a minimum resource in an $(N-i)^{th}$ target object subset, the $(N-i)^{th}$ target object subset including the first N−i target objects in the target object set, i being an incremental natural number, a value range thereof being $1 \leq i \leq N-2$, $N>1$, and N being a positive integer; and performing combination processing on the $(N-i)^{th}$ grouping combination based on the $N^{th}$ target object to obtain N−2 grouping combinations; the plurality of grouping combinations including the N−2 grouping combinations.

In an implementation, the target object being a text is used as an example for description. It is assumed that character lengths of texts included in the target object set are 17, 18, 52, 63, and 77, respectively. To clearly describe the embodiments of this application, in the following description, requests of corresponding lengths are respectively represented by the character lengths 17, 18, 52, 63, and 77. In this embodiment of this disclosure, the texts are sorted according to character length sizes, and the sorted texts are 17, 18, 52, 63, and 77. The $N^{th}$ text is a text corresponding to the character length 77. In this embodiment of this disclosure, because N=5 and i is incremented from 1 to N−2=3 in iterations, N−2 grouping combinations include the following three grouping combinations:

(1) When i=1, the $N^{th}$ text (i.e., the last i (i=1) text) is packaged into one group (batch) separately, and the remaining first N−i=4 texts 17, 18, 52, and 63 have a plurality of grouping/batch manners. A batch manner with the lowest resource consumption is used as the fourth grouping combination (the $(N-i)^{th}$ grouping combination). Assuming that the batch manner with the lowest resource consumption in an $(N-1)^{th}$ target object subset 17, 18, 52, and 63 is {17, 18} {52} {63}, where { } represents one batch, {17, 18} {52} {63} {77} are used as a grouping combination of N−2 grouping combinations.

(2) When i=2, 77 and 63 (i.e., the last i (i=2) texts) form one batch {63, 77}, and the remaining first N−i=3 texts 17, 18, and 52 have a plurality of batch manners. A batch manner with the lowest resource consumption is used as the third grouping combination. Assuming that the grouping combination with the lowest resource consumption of 17, 18, and 52 is {17, 18} {52}, then {17, 18} {52} {63, 77} are used as a grouping combination of N−2 grouping combinations.

(3) When i=3, 77, 52, and 63 (i.e., the last i (i=3) texts) are combined into one batch {52, 63, 77}, and the remaining first N−i=2 texts 17 and 18 have a plurality of batch manners. A batch manner with the lowest resource consumption is used as the second grouping combination. Assuming that the grouping combination with the lowest resource consumption of 17 and 18 is {17, 18}, {17, 18} {52, 63, 77} are used as a grouping combination of N−2 grouping combinations.

In this embodiment of this disclosure, that the target object set includes text information of five different character lengths 17, 18, 52, 63, and 77 is used as an example for description. This embodiment is merely used for describing this application. A quantity of texts included in a specific target object set and a quantity of characters included in the text may be determined according to an actual situation. For example, the target object set may include texts of different character lengths 11, 13, 23, 25, 33, 46, 78, 98, 100, . . . . In this embodiment of this disclosure, a plurality of grouping (batch) manners of the target object set may be determined. Each grouping (batch) manner includes a grouping combination with the minimum resource consumption. By comparing the plurality of batch manners, a batch manner with the minimum resource consumption in the target object set may be determined. By processing media information in this manner, a technical effect of resource saving can be achieved. Using the example above, 3 grouping combinations (corresponding to i=1, i=2, and i=3) may be compared, to determine the grouping combination requiring minimum resource consumption.

In some embodiments, the performing batch processing on target objects in the target object set to obtain a plurality of grouping combinations includes: performing combination processing on a first batch of target objects and a second batch of target objects to obtain a first grouping combination; the first batch of target objects including the first target object in the target object set, and the second batch of target objects including the last N−1 target objects in the target object set; and acquiring a second grouping combination, a batch of target objects in the second grouping combination including the target object set; and the plurality of grouping combinations including the first grouping combination and the second grouping combination.

In an implementation, texts whose character lengths are respectively 17, 18, 52, 63, and 77 are used as an example for description. In this case, there are 5 (N=5) objects. 77 (the last, or Nth) may be further combined with 18, 52, and 63 into one batch {18, 53, 63, 77}, and 17 is separately used as one batch {17}, to obtain a first grouping combination {17} {18, 53, 63, 77}. 77 may alternatively be combined with 17, 18, 52, and 63 into one batch {17, 18, 53, 63, 77} as a second grouping combination. That is, in each round of grouping, first of all, the Nth object is either selected alone as a group, or the Nth object is combined with one or more other objects to form a group. Then the rest of objects may be grouped further to obtain one or more groups. Each round of grouping generates a grouping combination. In this embodiment of this disclosure, a plurality of grouping manners of an $N^{th}$ piece of media information are determined, a batch manner with the minimum resource consumption is determined in the plurality of batch manners, and the media information is inputted in batches to the neural network model according to a grouping combination, thereby reducing resource consumption.

In some embodiments, the $(N-i)^{th}$ grouping combination is acquired when descending sorting is performed on the target objects in the target object set based on a quantity of object elements of the target objects; the $(N-i)^{th}$ grouping combination including N−i $(N-i)^{th}$ target objects, and the $(N-i)^{th}$ target object being the $(N-i)^{th}$ target object in the descending sorting in the target object set.

In an implementation, when the target object is a text, an object element may be a character or a word, and a quantity of object elements may be a quantity of characters or words included in the text, and may be represented by a character length of the text. When the target object is an image, the object element may be a pixel, and the quantity of object elements may be a quantity of pixels, and may be represented by a pixel value of the image. When the target object is a video, the object element may be an image included in the video, and a quantity of object elements may be a quantity of images included in the video. When the target object is audio, the object element may be a frame of notes included in the audio, and the quantity of object elements may be a quantity of notes included in the audio.

In this embodiment of this disclosure, the target objects in the target object set may be first sorted according to the quantity of object elements. For example, the target object set is an image set, pixel values of images included in the image set are respectively 125, 256, 512, 405, and 318, and the images may be sorted according to pixel values, and the sorted images are respectively images corresponding to 125, 256, 318, 405, and 512. In this embodiment of this disclosure, the pixel value of the image is merely used for describing this application. A pixel value of a specific image is determined according to an actual situation. In this embodiment of this disclosure, by sorting first and then determining various grouping combinations, batching efficiency can be improved, thereby achieving a technical effect of improving efficiency.

In some embodiments, before the target grouping combination with the minimum resource consumption is determined in the plurality of grouping combinations, a resource consumed by each grouping combination in the plurality of grouping combinations is obtained in a pre-established resource consumption table, where the resource consumption table records resources consumed by target objects of different quantities of object elements.

Figure 8:
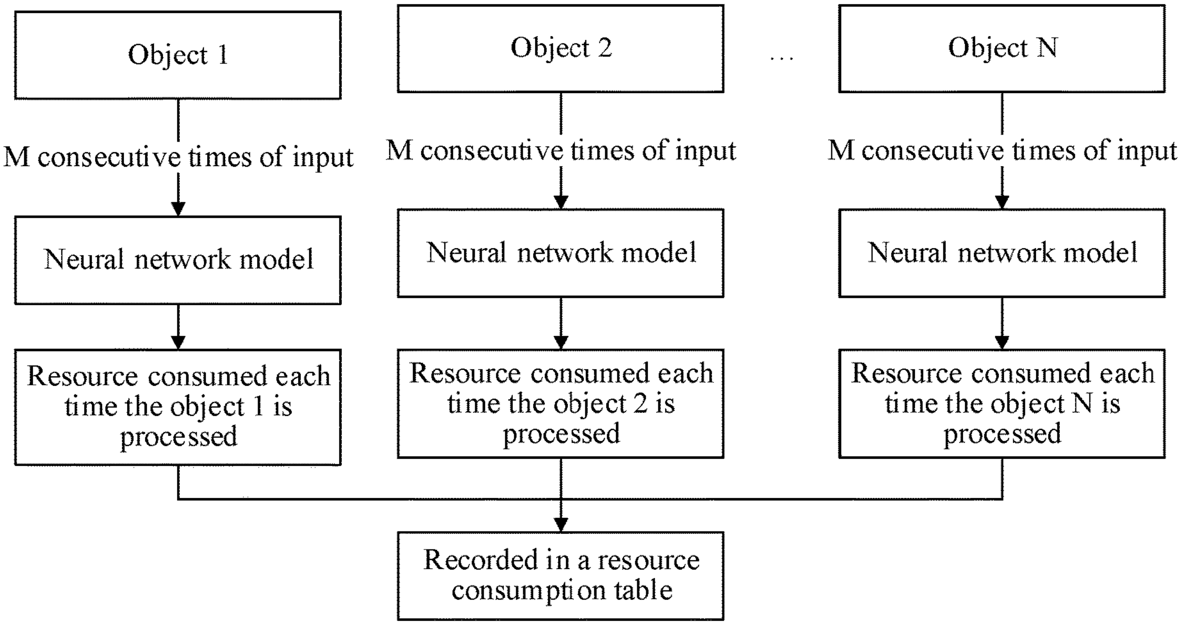
FIG. 8 is a schematic flowchart of resource consumption of a target object according to an embodiment of this disclosure.

In an implementation, resources consumed by different target objects may be determined in advance by using actual running of the neural network model. FIG. 8 is a schematic flowchart of resource consumption of a target object according to an embodiment of this disclosure. Each target object (an object 1, an object 2, . . . , and an object N) is inputted to the target neural network model for M consecutive times, to obtain a resource consumed by the target neural network model when processing the target object. The media information of the foregoing five different character lengths 17, 18, 52, 63, and 77 is used as an example. It is assumed that a resource consumed in each batch manner obtained by using the foregoing texts of the foregoing several different character lengths to run the neural network model is shown in a resource consumption table 1. A character length represents a quantity of characters included in a text, and a batch size represents a quantity of times of input to the neural network model. For example, the character length is 17 and the batch size is 2, which indicates that a text of a character length 17 is inputted twice to the target neural network model. A resource consumed when the neural network model processes the text inputted each time is 16.15.

TABLE 1

| | Character length | | | | |
|---|---|---|---|---|---|
| Batch size | 17 | 18 | 52 | 63 | 77 |
| 1 | 17 | 18 | 52 | 63 | 77 |
| 2 | 16.15 | 17.09 | 49.4 | 59.85 | 73.15 |
| 3 | 15.3 | 16.2 | 46.80 | 56.7 | 69.3 |
| 4 | 14.45 | 15.30 | 44.20 | 53.55 | 65.45 |
| 5 | 13.60 | 14.4 | 41.6 | 50.4 | 61.6 |

In an implementation, a resource consumption table (cached_cost) is an index table, which is indexed by using two keys, that is, a character length and a batch size, and a value is processing overhead corresponding to a target object. The overhead may be an actual time delay, or may be normalized information. For example, cached_cost[10][2] indicates overhead of a grouping combination in which the quantity of object elements of the target object is 10, and the batch size is 2. A value of cached_cost may be collected in advance by running the neural network, and is periodically and persistently stored in a hard disk or a database. For example, for a plurality of batches of target objects included in a grouping combination, if a server has previously processed target objects of the same batch, cached_cost returns, through indexing, a delay recorded previously. A text whose character length is 17 shown in Table 1 is used as an example. Assuming that a batch size is 2, a resource consumption table may be retrieved by using an index [17][2], to obtain that cached_cost[17][2] is 16.15. In this embodiment of this disclosure, by using a quantity of object elements and a batch size included in a target object as an index, a resource consumed by each grouping combination may be obtained by querying a resource consumption table, and query efficiency of a resource consumption value can be improved in a manner of retrieving a quantity of object elements and a batch size.

In some embodiments, a resource consumed in a case that a target object of each quantity of object elements is continuously inputted for M times to the target neural network model for processing is acquired, M being a natural number; and average processing is performed based on the resource consumed in a case that the target object of each quantity of object elements is continuously inputted for M times to the target neural network model for processing, to obtain a resource consumed by the target neural network model each time processing the target object; and the resource consumption table records the resource consumed by the target neural network model each time processing the target object, in a case that target objects of different quantities of object elements are continuously inputted for M times to the target neural network model for processing.

In an implementation, as shown in Table 1, the resource consumption table records resources consumed when each text is inputted to the neural network model for different times. For example, when the text with the character length 17 is inputted to the neural network model for the first time, the resource consumed is 17; when the text with the character length 17 is inputted to the neural network model twice in a row, the resource consumed by the neural network model when processing the text with the character length 17 at a time is 16.15. When a text with a character length 18 is input to the neural network model for three consecutive times, the resource consumed by the neural network model when processing the text with the character length 18 at a time is 16.2.

In some embodiments, the querying, based on $S_j$ batches of target objects included in the $j^{th}$ grouping combination, a consumed resource recorded in the resource consumption table includes: querying, based on $S_j$ batches of target objects included in the $j^{th}$ grouping combination, a consumed resource recorded in the resource consumption table, to obtain a total quantity of $S_j$ consumed resources; and determining a sum of the total quantity of $S_j$ consumed resources as a resource consumed by the $j^{th}$ grouping combination.

In an implementation, each grouping combination includes a plurality of batches of target objects. The foregoing texts whose character lengths are respectively 17, 18, 52, 63, and 77 are used as an example for description. For example, the grouping combination {17, 18} {52} {63} {77} includes four pieces of media information: {17, 18}, {52}, {63}, and {77}, where {17, 18} may be $S_1$ batches of text information, {52} may be $S_2$ batches of text information, {63} may be $S_3$ batches of text information, {77} may be $S_4$ batches of text information. A resource consumed by each batch of text information may be obtained by querying the resource consumption table, and a sum of resources consumed by all batches of text information is used as a resource consumed by texts whose character lengths are respectively 17, 18, 52, 63, and 77. For example, for {52}, a resource consumed by this batch of texts {52} may be obtained by using a character length [52] as an index and a batch size [1] as an index, to query the resource consumption table, that is, 52.

In some embodiments, the querying, based on $S_j$ batches of target objects included in the $j^{th}$ grouping combination, a consumed resource recorded in the resource consumption table includes: determining, in a case that the first batch of target objects in the $S_j$ batches of target objects includes t target objects of different quantities of object elements, a first target object with a largest quantity of object elements; and determining a total resource consumed in a case that the first target object is inputted fort consecutive times to the target neural network model for processing, as a resource consumed by the first batch of target objects, t being a natural number.

In an implementation, the foregoing grouping combinations {17, 18} {52, 63, 77} are used as an example for description. {17, 18} includes texts of two different character lengths 17 and 18. For the batch of texts {17, 18}, a resource consumed when the text with a character length 18 is inputted to the neural network model for two consecutive times is a resource consumed by the batch of texts {17, 18}, and the resource consumed by the batch of texts {17, 18} is obtained by querying the resource consumption table, that is, 17.09*2=34.18. A resource consumed by {52, 63, 77} is a total resource consumed when the text is processed when 77 is inputted to the neural network model for three consecutive times, and the resource consumed by {52, 63, 77} may be obtained by querying the table, that is, 69.3*3=207.9.

In some embodiments, the querying, based on $S_j$ batches of target objects included in the $j^{th}$ grouping combination, a consumed resource recorded in the resource consumption table includes: determining, in a case that the resource consumption table does not record a resource consumed by the second batch of target objects in the $S_j$ batches of target objects, resources that are separately consumed by the third batch of target objects and the fourth batch of target objects adjacent to the second batch of target objects and that are recorded in the resource consumption table; and performing linear interpolation processing between the resources separately consumed by the third batch of target objects and the fourth batch of target objects, to obtain the resource consumed by the second batch of target objects.

In an implementation, the foregoing resource consumption table shown in Table 1 is used as an example for description. In Table 1, resources consumed by texts of different character lengths 17, 18, 52, 63, and 77 are recorded. If the second batch of texts is {65}, the resource consumed by 65 is not recorded in Table 1. In the table, a character length closest to 65 is 63 and 77. A resource consumed by {63} is 63 and a resource consumed by {77} is 77. By using linear interpolation between 63 and 77, the resource consumed by {65} is 65.

In an implementation, if the second batch of texts is {60, 68}, it is determined that a resource consumed by inputting 68 to the neural network model twice is a resource consumed by {60, 68}, but a resource consumed by inputting a text of 68 characters to the neural network model twice is not recorded in Table 1. The character lengths adjacent to 68 in the table are 63 and 77. When 63 is inputted to the neural network model twice in a row, the resource consumed by the neural network model during processing is 59.85. When 77 is inputted to the neural network model twice in a row, the resource consumed by the neural network model during processing is 73.15. The resource consumed by the neural network model during processing when a text of 68 characters is inputted twice consecutively can be obtained by means of linear interpolation. Further, the resource consumed by the second batch of texts {60, 68} can be obtained.

In some embodiments, the performing batch processing on target objects in the target object set to obtain a plurality of grouping combinations includes: performing batch processing on target media information in a target media information set to obtain a plurality of grouping combinations; the determining, from the plurality of grouping combinations, a target grouping combination with minimum resource consumption includes: determining, from the plurality of grouping combinations, a target grouping combination with minimum resource consumption; a resource consumed by each grouping combination in the plurality of grouping combinations including: a sum of resources consumed by inputting in batches a plurality of batches of target media information included in each grouping combination to a target neural network model for processing; and the inputting in batches a plurality of batches of target objects included in the target grouping combination to the target neural network model for processing includes: inputting in batches a plurality of batches of target media information included in the target grouping combination to the target neural network model for processing.

In some embodiments, the performing batch processing on target media information in a target media information set to obtain a plurality of grouping combinations includes: acquiring grouping combinations of an $N^{th}$ piece of media information in the target media information set and an $(N-i)^{th}$ piece of grouping combinations, to obtain a total of N−2 pieces of grouping combinations. The target media information set includes N pieces of media information, the $(N-i)^{th}$ grouping combination is a grouping combination that consumes the minimum resource in the $(N-i)^{th}$ media information subset, the $(N-i)^{th}$ media information subset includes the first N−i pieces of media information in the target media information set, i is greater than or equal to 1 and is less than or equal to N−2, and the plurality of grouping combinations include N−2 grouping combinations.

In some embodiments, the performing batch processing on target media information in a target media information set to obtain a plurality of grouping combinations includes: acquiring a first grouping combination, the first grouping combination including the first batch of media information and the second batch of media information, the first batch of media information including the first piece of media information in the target media information set, and the second batch of media information including the last N−1 pieces of media information in the target media information set; and acquiring a second grouping combination, a batch of media information in the second grouping combination including the target media information set; the plurality of grouping combinations further including the first grouping combination and the second grouping combination.

In some embodiments, when the media information in the target media information set is sorted according to character lengths of the media information, the $(N-i)^{th}$ grouping combination is acquired. The $(N-i)^{th}$ grouping combination includes N−i $(N-i)^{th}$ piece of media information, and the $(N-i)^{th}$ piece of media information is the $(N-i)^{th}$ piece of media information in the target media information set.

In some embodiments, before the target grouping combination with the minimum resource consumption is determined in the plurality of grouping combinations, a resource consumed by each grouping combination in the plurality of grouping combinations is obtained in a pre-established resource consumption table, where the resource consumption table records resources consumed by media information of different character lengths.

In some embodiments, a resource consumed when media information of each character length in different character lengths is inputted to the target neural network model for M consecutive times for processing, M being a natural number; and the resource consumption table records a resource consumed by the target neural network model each time processing the media information, in a case that media information of each character length in different character lengths is inputted to the target neural network model for M consecutive times for processing.

In some embodiments, the acquiring, in a pre-established resource consumption table, a resource consumed by each grouping combination of the plurality of grouping combinations includes: performing the following operations on a $j^{th}$ grouping combination of the plurality of grouping combinations, to obtain a resource consumed by the $j^{th}$ grouping combination, j being a natural number: acquiring consumed resources that are recorded in the resource consumption table and that are of $S_j$ batches of media information included in the $j^{th}$ grouping combination, to obtain a total quantity of $S_j$ consumed resources; and determining a resource consumed by the $j^{th}$ grouping combination as a sum of $S_j$ consumed resources.

In some embodiments, the acquiring consumed resources that are recorded in the resource consumption table and that are of $S_j$ batches of media information included in the $j^{th}$ grouping combination includes: when the first batch of media information in the $S_j$ batch of media information includes media information oft different character lengths, determining a total resource consumed is a resource consumed by the first batch of media information when the first media information with the longest character length is inputted to the target neural network model for t consecutive times for processing, where t is a natural number.

In some embodiments, the acquiring consumed resources that are recorded in the resource consumption table and that are of $S_j$ batches of media information included in the $j^{th}$ grouping combination, to obtain a total quantity of $S_j$ consumed resources includes: when no resource consumed by the second batch of media information in the $S_j$ batch of media information is recorded in the resource consumption table, determining resources that are consumed by the third batch of media information and the fourth batch of media information adjacent to the second batch of media information and that are recorded in the resource consumption table; and performing linear interpolation between the resources consumed by the third batch of media information and the fourth batch of media information, to obtain the resource consumed by the second batch of media information.

In some embodiments, the performing batch processing on target media information in a target media information set to obtain a plurality of grouping combinations includes at least one of the following: performing batch processing on target text information in a target text information set to obtain a plurality of text grouping combinations; performing batch processing on target image information in a target image information set to obtain a plurality of image grouping combinations; performing batch processing on target audio information in a target audio information set to obtain a plurality of audio grouping combinations; and performing batch processing on target video information in a target video information set to obtain a plurality of video grouping combinations.

Figure 9:
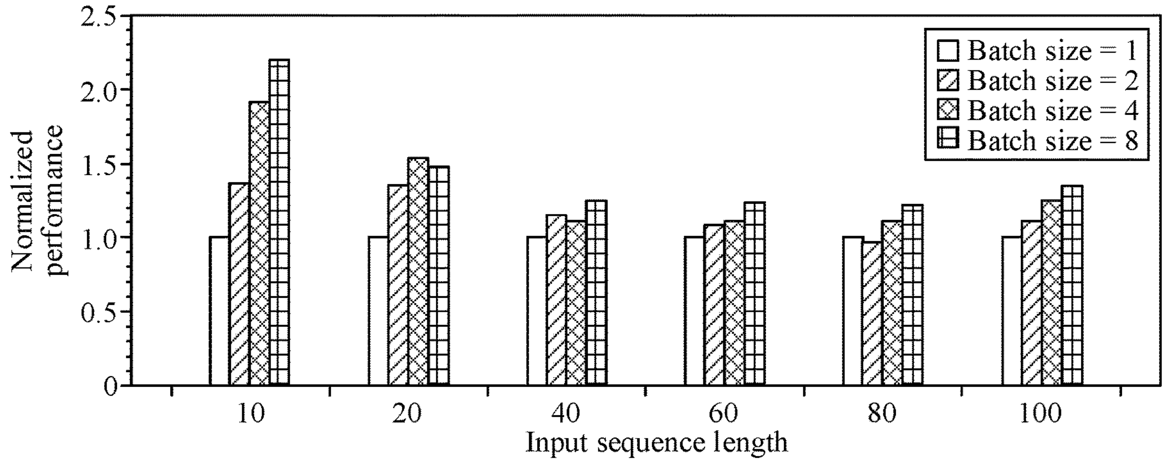
FIG. 9 is a schematic performance diagram of processing requests of different batch sizes according to an embodiment of this disclosure.

In one implementation, batch processing may bring a gain to deep learning reasoning efficiency. FIG. 9 is a schematic performance diagram of processing requests of different batch sizes according to an embodiment of this disclosure. In FIG. 9, a horizontal axis represents a length of an input request sequence, is a dimension of an input change, and a vertical axis is normalized performance that is calculated by relatively using a batch size batch size=1. In this embodiment of this disclosure, a central processing unit (CPU) is configured to perform reasoning calculation on a standard BERT model. It may be learned from FIG. 9 that a batch size (batch size) increases from 1 to 8, which results in different degrees of performance improvement, and a larger batch size leads to higher improvement. However, the packaged-to-batch process requires that sizes of all requests be added with zero to reach the maximum value of an input sequence, which also introduces some additional overheads.

The service end may improve service efficiency by using a batch processing technology. For example, the service end receives five BERT reasoning text requests, and inputted sequence lengths are respectively 17, 18, 52, 63, and 77. If reasoning is performed for five times, a batch size is 1 each time. The experiment on the processor shows that the total time consumed to complete the reasoning for five times is 0.415 seconds, and a throughput is 12.05 queries per second (QPS). In another manner, a request sub-sequence whose length is {63, 77} is packaged into one batch, and a request whose length is 63 needs to be added with zero to reach 77. In this case, there are two requests whose length is 77 in this batch. Similarly, a length of {17, 18} may be packaged into one batch, and {52} is a single batch. In this way, the three batches are calculated. A total reasoning time is 0.363 seconds, and a throughput is 13.77 QPS. Compared with the original five times of reasoning, the performance is improved by 14.3%. The larger the quantity of requests, the more obvious the throughput improvement is.

In this embodiment of this disclosure, the input may be a request sequence (request_list), and the output may be a batch scheduling scheme that can obtain the maximum service throughput. There is only one input change dimension. Here, it is assumed that the input is a sentence, and the change dimension is a sentence length. The input may also be in another format. For example, for an image processing task, the input may be all pixel information of a picture, and a change dimension may be a picture size. The request may also be an abstract feature. For example, for an NLP task that uses BERT as a neural network structure, a request may be a floating-point number tensor with a size (sequence length, hidden size), and a change dimension may be sequence length.

An input request_list is a request sequence, and cached_cost is an index table. It is indexed by two keys: sequence length and batch size. A value is a processing overhead corresponding to the request. This overhead is not necessarily an actual time delay, but may be normalized information. cached_cost[10][2] indicates a normalized calculation overhead of the request when the sequence length is 10 and the batch size is 2. The value of cached_cost is collected by calculating frame runtime, and is periodically and persistently stored in a hard disk or a database. For example, for a batch request, if the server has previously processed a request of the same batch size and the same input size, cached_cost returns, through indexing, a delay recorded previously. If a corresponding position of cached_cost does not have a corresponding value, the value can be estimated by interpolating adjacent positions. After the service ends, the real overhead is updated to the corresponding position of cached_cost. In the initial start of the service, cached_cost may be initialized by preheating cached_cost by using a large quantity of random requests.

The request_list is sorted in ascending order of sequence length dimensions, and the subscript of the index starts from 1. Then, an array named states is created, and is used for caching intermediate result information. Specifically, the position of subscript i is used for recording the minimum overhead of processing request_list[1:i]. states[0]=0 is to facilitate processing of boundary conditions, and states[1] is an overhead of processing the first request request_list[1]. Starting from the second request, each request of request_list is traversed. Each traversal process calculates the minimum overhead state[i] of the service sub-sequence request_list[1:i], and calculating the minimum overhead uses a dynamic programming algorithm. A state transfer equation thereof is as follows:

$$\text{states}[i] = \min_{0\le j\le i}(\text{cached\_cost}[\text{request\_list}[i].\text{length}][i-j+1]*(i-j+1)+\text{states}[j-1])$$

If a subscript j that can obtain the minimum overhead is found, this means that the sub-sequence request_list[j:i] is packaged into a batch for processing, and start_idx_list records the start subscript of this batch. After the minimum overhead of processing request_list is obtained, backtracking is performed by using information recorded in start_idx_list to package the corresponding start position and end position, to form a sub-sequence, that is, one batch.

The following uses a target object being a text request as an example for description. For example, five texts whose lengths are 17, 18, 52, 63, and 77 are inputted, and an index table cached_cost is Table 1. When the algorithm starts, states[0]=0, states[1]=17, and start_idx_list[1]=1.

When i=2, for the request 18, there are the following two grouping combinations: 1) 18 may form a batch separately. The grouping combination is 1171{18}. A resource consumed by the grouping combination may be obtained by querying the table, that is, 17+18=35. 2) 18 and 17 may be combined into one batch {17, 18}. It can be learned by querying the table that a resource consumed in this manner is 17.09*2=34.18. Compared with the two grouping combinations 1) and 2), it can be learned that 34.18 is smaller. In this case, it is determined that the grouping combination of 17 and 18 that consumes the minimum resource is {17, 18}. In this case, states[2]=34.18 and start_idx_list[2]=1.

When i=3, for the request 52, there are the following three grouping combinations: 1) It may form a batch {52} separately. Because the minimum overhead of processing the subsequence {17, 18} is known, that is, states[2]=34.18, a total overhead is 34.18+52=86.18. 2) 52 and 18 may be combined into one batch {18, 52}. In this case, it is known that the minimum overhead of the subsequence {17} is states[1]=17, the overhead of the batch {18, 52} is 49.4*2, and the total overhead is 49.4*2+17=115.8. 3) 52 and 17, 18 may be combined into one batch {17, 18, 52}, and a total overhead is 46.80*3=140.40. Therefore, states[3]=min (86.18, 115.8, 140.39)=86.18. It is determined that the grouping combination of 17, 18, and 52 that consumes the minimum resource is {17, 18}{52}. In this case, start_idx_list[3]=3.

When i=4, for the request 63, the following four grouping combinations exist: 1) It may form a batch {63} separately. Because the minimum overheads of 17, 18, and 52 are known, the overhead corresponding to {17, 18}{52} is states[3]=86.18, and in this case, the total overhead is 86.18+63=149.18. 2) 63 and 52 may be combined into one batch {52, 63}. In this case, it is known that the minimum overhead of 17 and 18 is states[2]=34.18 corresponding to {17, 18}, and the total overhead is 59.85*2+34.18=153.88. 3) 63 may be combined with 18 and 52 to form a batch {18, 52, 63}. Because {17} is known to have the minimum overhead of states[1]=17, in this case, the total overhead is 56.7*3+17=187.10. 4) 63 may be combined with 17, 18, and 52 to be {17, 18, 53, and 63}. In this case, the total overhead is 53.55*4=214.2. Therefore, states[4]=min(149.18, 153.88, 187.10, 214.2)=149.18, and a corresponding grouping combination is {17, 18}{52}{63}. start_idx_list[4]=4.

When i=5, for the request 77, there are the following five grouping combinations: 1) 77 may form a batch. Because the minimum overhead of the sub-sequence 17, 18, 52, and 63 is known, that is, the resource states[4]=149.18 corresponding to {17, 18}{52}{63}, the total overhead is 149.18+77=226.18. 2) 77 and 63 may be combined into one batch {63, 77}. In this case, it is known that the minimum overhead of the request sequence 17, 18, and 52 is a resource overload states[3]=86.18 corresponding to {17, 18}{52}, and the total overhead is 73.15*2+86.18=232.48. 3) 77 may be combined with 52 and 63 into one batch {52, 63, 77}. Because it is known that the minimum overhead of 17 and 18 is a resource overload states[2]=34.18 corresponding to {17, 18}, the total overhead is 69.3*3+34.18=242.08. 4) 77 may be combined with 18, 52, and 63 to be {18, 53, 63 and 77}. In this case, the total overhead is 65.45*4+17=278.8. 5)

77 may be combined with 17, 18, 52, and 63 into one batch {17, 18, 53, 63, 77}. In this case, the total overhead is 61.6*5=308.0. Therefore, states[5]=min(226.18, 232.48, 242.08, 278.8, 308.0)=226.18, a corresponding grouping combination is {17, 18}{52}{63}{77}, and start_idx_list[5]=5. Finally, the optimal batch scheduling scheme is the target grouping combination including{16, 17} {52} {63} {77}. The target grouping combination including{16, 17} {52} {63} {77} is inputted in batches to the neural network model for processing, so that a resource consumed is the minimum, and a technical effect of reducing resource consumption and saving a resource is achieved.

For ease of description in the foregoing method embodiments, each method is described as a combination of a series of operations. However, a person skilled in the art understands that this application is not limited to the order of the described operations because some steps according to this application may occur in other order or occur in parallel. In addition, a person skilled in the art is also to learn that the embodiments described in this specification are all exemplary embodiments, and the involved actions and modules are not necessarily required to this application. In this disclosure, a unit and a module may be hardware such as a combination of electronic circuitries; firmware; or software such as computer instructions. The unit and the module may also be any combination of hardware, firmware, and software. In some implementation, a unit may include at least one module. Each unit or module can be implemented using one or more processors (or processors and memory). Likewise, a processor (or processors and memory) can be used to implement one or more units or modules. Moreover, each unit or module can be part of an overall unit or module that includes the functionalities of the unit or module.

Figure 10:
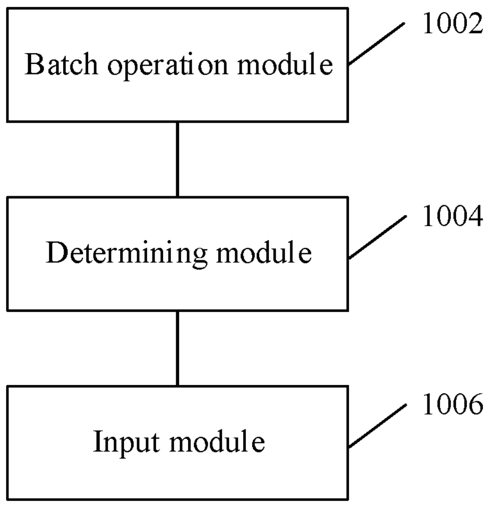
FIG. 10 is a schematic structural diagram of an object processing apparatus according to an embodiment of this disclosure.

An embodiment of this disclosure further provides an apparatus of an object used for implementing the foregoing object processing method. As shown in FIG. 10, the apparatus includes a batch operation module 1002, configured to perform batch processing on target objects in a target object set to obtain a plurality of grouping combinations; a determining module 1004, configured to determine, from the plurality of grouping combinations, a target grouping combination that consumes the minimum resource; a resource consumed by each grouping combination in the plurality of grouping combinations including: a sum of resources consumed by inputting in batches a plurality of batches of target objects included in each grouping combination to a target neural network model for processing; and an input module 1006, configured to input in batches a plurality of batches of target objects included in the target grouping combination to the target neural network model for processing.

In some embodiments, the batch operation module includes an acquiring unit, configured to acquire an $N^{th}$ target object in the target object set and an $(N-i)^{th}$ grouping combination; the target object set including N target objects, the $(N-i)^{th}$ grouping combination being a grouping combination that consumes a minimum resource in an $(N-i)^{th}$ target object subset, the $(N-i)^{th}$ target object subset including the first N−i target objects in the target object set, i being an incremental natural number, a value range thereof being 1≤i≤N−2, N>1, and N being a positive integer; and perform combination processing on the $(N-i)^{th}$ grouping combination based on the $N^{th}$ target object to obtain N−2 grouping combinations; the plurality of grouping combinations including the N−2 grouping combinations.

In some embodiments, the batch operation module is further configured to perform combination processing on a first batch of target objects and a second batch of target objects to obtain a first grouping combination; the first batch of target objects including the first target object in the target object set, and the second batch of target objects including the last N−1 target objects in the target object set; and acquire a second grouping combination, a batch of target objects in the second grouping combination including the target object set; the plurality of grouping combinations including the first grouping combination and the second grouping combination.

In some embodiments, the batch operation module is further configured to: acquire the $(N-i)^{th}$ grouping combination in a case that descending sorting is performed on the target objects in the target object set based on a quantity of object elements of the target objects; the $(N-i)^{th}$ grouping combination including N−i $(N-i)^{th}$ target objects, and the $(N-i)^{th}$ target object being the $(N-i)^{th}$ target object in the descending sorting in the target object set.

In some embodiments, the apparatus further includes a processing module configured to acquire a resource consumed by each grouping combination in the plurality of grouping combinations in a pre-established resource consumption table, where the resource consumption table records resources consumed by target objects of different quantities of object elements.

In some embodiments, the processing module is further configured to acquire a resource consumed in a case that a target object of each quantity of object elements is continuously inputted for M times to the target neural network model for processing, M being a natural number; and perform average processing based on the resource consumed in a case that the target object of each quantity of object elements is continuously inputted for M times to the target neural network model for processing, to obtain a resource consumed by the target neural network model each time processing the target object; the resource consumption table recording the resource consumed by the target neural network model each time processing the target object, in a case that target objects of different quantities of object elements are continuously inputted for M times to the target neural network model for processing.

In some embodiments, the processing module is further configured to acquire, in the following manner, in a pre-established resource consumption table, a resource consumed by each grouping combination of the plurality of grouping combinations: performing the following operations on a $j^{th}$ grouping combination of the plurality of grouping combinations, j being a natural number: querying, based on $S_j$ batches of target objects included in the $j^{th}$ grouping combination, a consumed resource recorded in the resource consumption table, to obtain a total quantity of $S_j$ consumed resources; and determining a sum of the total quantity of $S_j$ consumed resources as a resource consumed by the $j^{th}$ grouping combination.

In some embodiments, the processing module is further configured to acquire, in the following manner, consumed resources that are recorded in the resource consumption table and that are of $S_j$ batches of target objects included in the $j^{th}$ grouping combination: determining, in a case that the first batch of target objects in the $S_j$ batches of target objects includes t target objects of different quantities of object elements, a first target object with a largest quantity of object elements; and determining a total resource consumed in a case that the first target object is inputted for t consecutive times to the target neural network model for processing, as a resource consumed by the first batch of target objects, t being a natural number.

In some embodiments, the processing module is further configured to acquire, in the following manner, consumed resources that are recorded in the resource consumption table and that are of $S_j$ batches of target objects included in the $j^{th}$ grouping combination: determining, in a case that the resource consumption table does not record a resource consumed by the second batch of target objects in the $S_j$ batches of target objects, resources that are separately consumed by the third batch of target objects and the fourth batch of target objects adjacent to the second batch of target objects and that are recorded in the resource consumption table; and performing linear interpolation processing between the resources separately consumed by the third batch of target objects and the fourth batch of target objects, to obtain the resource consumed by the second batch of target objects.

In some embodiments, the apparatus is further configured to perform batch processing on target media information in a target media information set to obtain a plurality of grouping combinations; determine, from the plurality of grouping combinations, a target grouping combination that consumes the minimum resource; a resource consumed by each grouping combination in the plurality of grouping combinations including: a sum of resources consumed by inputting in batches a plurality of batches of target media information included in each grouping combination to a target neural network model for processing; and inputting in batches a plurality of batches of target media information included in the target grouping combination to the target neural network model for processing.

In some embodiments, the batch operation module is further configured to perform batch processing on target text information in a target text information set to obtain a plurality of text grouping combinations; perform batch processing on target image information in a target image information set to obtain a plurality of image grouping combinations; perform batch processing on target audio information in a target audio information set to obtain a plurality of audio grouping combinations; and perform batch processing on target video information in a target video information set to obtain a plurality of video grouping combinations.

Figure 11:
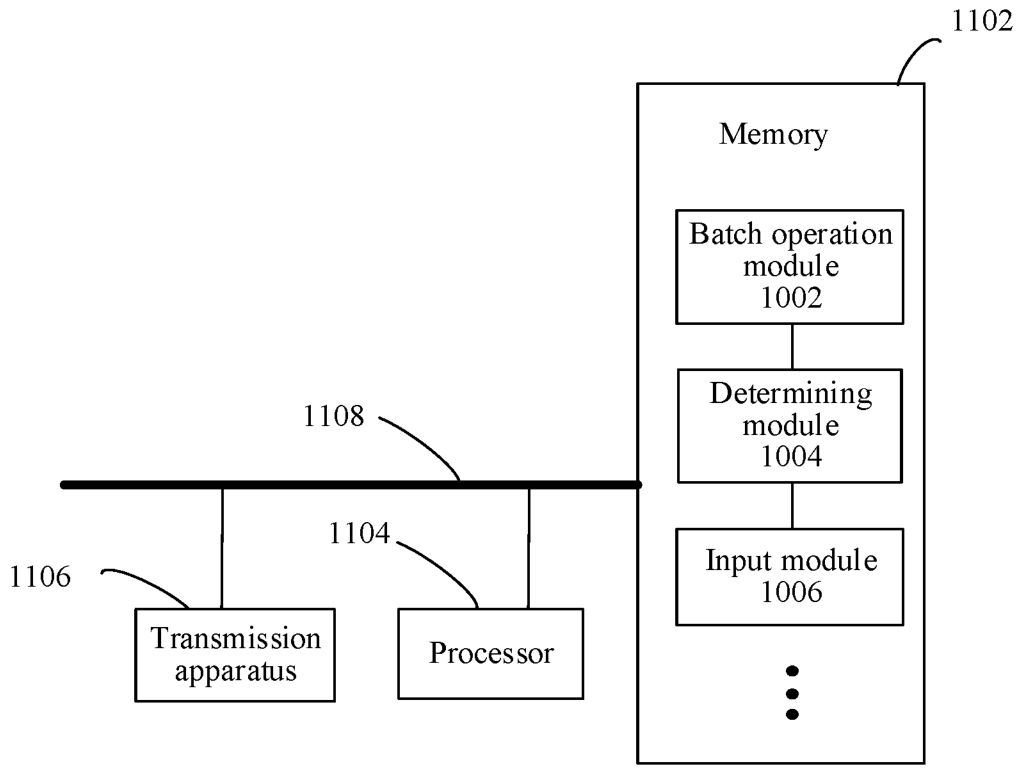
FIG. 11 is a schematic structural diagram of an electronic device according to an embodiment of this disclosure.

An embodiment of this disclosure further provides an electronic device used for implementing the foregoing media information processing method based on batch media information. The electronic device may be the terminal or the server shown in FIG. 1. For example, the electronic device being a server is used as an example for describing in the embodiments of this application. As shown in FIG. 11, the electronic device includes a memory 1102 and a processor 1104. The memory 1102 stores a computer program. The processor 1104 is configured to perform steps of any one of the foregoing method embodiments by using a computer program.

In some embodiments, in the embodiments of this application, the electronic device may be located in at least one of a plurality of network devices in a computer network.

In some embodiments, in the embodiments of this application, the processor may be configured to perform the following steps through the computer program:

S1: Perform batch processing on target objects in a target object set to obtain a plurality of grouping combinations.

S2: Determine, from the plurality of grouping combinations, a target grouping combination that consumes the minimum resource; a resource consumed by each grouping combination in the plurality of grouping combinations including: a sum of resources consumed by inputting in batches a plurality of batches of target objects included in each grouping combination to a target neural network model for processing.

S3: Input in batches a plurality of batches of target objects included in the target grouping combination to the target neural network model for processing.

In some embodiments, a person of ordinary skill in the art may understand that, the structure shown in FIG. 11 is only schematic. Electronic equipment or the electronic device may be a terminal such as a smartphone (such as an Android mobile phone or an iOS mobile phone), a tablet computer, a palmtop computer, a MID, or a PAD. FIG. 11 does not limit the structures of the electronic apparatus and the electronic device. For example, the electronic apparatus and the electronic device may include more or fewer components than those shown in FIG. 11 (such as a network interface), or possess a different configuration than that shown in FIG. 11.

The memory 1102 may be configured to store a software program and a module, for example, a program instruction/module corresponding to the object processing method and apparatus in the embodiments of this application. The processor 1104 executes various functional applications and data processing by running the software program and the module that are stored in the memory 1102, that is, implements the foregoing object processing method. The memory 1102 may include a high-speed random access memory, and may further include a non-volatile memory, for example, at least one disk storage device, a flash memory, or other non-volatile solid-state memories. In some embodiments, the memory 1102 may further include memories disposed remotely from the processor 1104. The remote memories may be connected to the terminal by a network. Examples of the above network include, but are not limited to, the Internet, an intranet, a local area network, a mobile communication network, and a combination thereof. The memory 1102 may be specifically but not limited to information such as a resource consumption table. As an example, as shown in FIG. 11, the memory 1102 may include but not limited to the batch operation module 1002, the determining module 1004, and the input module 1006 in the foregoing media information processing apparatus based on the batch media information. In addition, the memory may further include but is not limited to another module unit in the foregoing media information processing apparatus based on the batch media information. Details are not described in this example.

In some embodiments, the input module 1006 is configured to receive or transmit data through a network. Specific examples of the network may include a wired network and a radio network. In an example, a transmission apparatus 1106 includes a network adapter (NIC). The network adapter may be connected to other network devices and routers through a network cable so as to communicate with the Internet or a local area network. In an example, the transmission apparatus 1106 is a radio frequency (RF) module configured to communicate with the Internet in a wireless manner.

In addition, the electronic device further includes a connection bus 1108, configured to connect to each module component in the electronic device.

In another embodiment, the terminal or server may be a node in a distributed system. The distributed system may be a blockchain system. The blockchain system may be a distributed system formed by connecting the plurality of nodes in the form of network communication. A peer-to-peer (P2P) network may be formed between the nodes. Any form of computing devices such as electronic devices like a server or a terminal may become a node in the blockchain system by joining the peer-to-peer network.

According to an aspect of this application, a computer program product or a computer program is provided, including computer instructions, the computer instructions being stored in a computer-readable storage medium. A processor of a computer device reads the computer instruction from the computer readable storage medium, and the processor executes the computer instruction, so that the computer device executes the method provided in the foregoing media information processing method based on the batch media information.

In some embodiments, in this embodiment of this disclosure, the foregoing computer readable storage medium may be set to store computer programs configured to perform the following steps:

S1: Perform batch processing on target objects in a target object set to obtain a plurality of grouping combinations.

S2: Determine, from the plurality of grouping combinations, a target grouping combination that consumes the minimum resource; a resource consumed by each grouping combination in the plurality of grouping combinations including: a sum of resources consumed by inputting in batches a plurality of batches of target objects included in each grouping combination to a target neural network model for processing.

S3: Input in batches a plurality of batches of target objects included in the target grouping combination to the target neural network model for processing.

In some embodiments, in the embodiments of this application, a person of ordinary skill in the art may understand that all or some of the steps of the methods in the foregoing embodiments may be implemented by a program instructing relevant hardware of the terminal. The program may be stored in a computer-readable storage medium, and the storage medium may include a flash disk, a read-only memory (ROM), a random access memory (RAM), a magnetic disk, an optical disc, and the like.

The sequence numbers of the foregoing embodiments of this application are merely for description purpose, and are not intended to indicate the preference among the embodiments.

The integrated units in the foregoing embodiments, if implemented in the form of a software functional unit and sold or used as a stand-alone product, may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, the description about each embodiment emphasizes a different facet. For a part that is not detailed in one embodiment, reference may be made to the relevant description in other embodiments.

In the embodiments provided in this application, it is understandable that the disclosed client may be implemented in other forms. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed couplings between different parts or direct couplings or communication connections may be indirect couplings or communication connections implemented through some interfaces, units, or modules, and may be implemented electrically or in other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments of this application.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

The above descriptions are merely preferred embodiments of this application, and a person of ordinary skill in the art may make various improvements and modifications without departing from the principle of this application. All such improvements and modifications shall also fall within the protection scope of this application.

What is claimed is:

1. A computer-implemented object processing method executed by one or more processors, comprising:

initializing, by the one or more processors, a target neural network model;

receiving, by the one or more processors, an object set comprising a plurality of objects of different quantities of object elements, the object set comprising inputs for the target neural network model;

grouping, by the one or more processors, the plurality of objects in the object set to obtain a plurality of grouping combinations;

determining, by the one or more processors and based on a resource consumption table, a target grouping combination that consumes a minimum resource from the plurality of grouping combinations, the determining comprising:

obtaining the resource consumption table generated based on pre-stored running history of the target neural network model, the resource consumption table storing resources consumed by objects of different quantities of object elements and different batch sizes, and being indexed by quantities of elements and the batch sizes;

acquiring, based on the resource consumption table, a resource value corresponding to each group in each grouping combination, wherein the resource value represents a predicted, normalized measure of performance of the target neural network model processing the each group in the each grouping combination, the measure of performance comprising at least one of: processing time, throughput, or another quantifiable metric;

calculating, by the one or more processors, a totalized resource corresponding to the each grouping combination in the plurality of grouping combinations comprising: a sum of the resource corresponding to the each group in the each grouping combination; and selecting the target grouping combination corresponding to a minimum totalized resource by automatically comparing totalized resources among the plurality of grouping combinations and storing a result in computer memory; and inputting, by the one or more processors, in batches each group in the target grouping combination to the target neural network model for batch processing, wherein the method produces at least one of a reduction in processing time, an increase in throughput, or a reduction in overall resource consumption.

2. The method according to claim 1, wherein grouping the plurality of objects in the object set comprises:

acquiring an Nth object in the object set and an $(N-i)^{th}$ grouping combination result;

the object set comprising N objects, the $(N-i)^{th}$ grouping combination being a grouping combination that consumes a minimum resource in an $(N-i)^{th}$ object subset, the $(N-i)^{th}$ object subset comprising first N−i objects in the object set, i being an incremental integer, a value range thereof being $1 \leq i \leq N-2$, $N>1$, and N being a positive integer; and performing combination processing on the $(N-i)^{th}$ grouping combination based on an Nth object to obtain N−2 grouping combinations;

the plurality of grouping combinations comprising the N−2 grouping combinations.

3. The method according to claim 2, further comprising:

acquiring the $(N-i)^{th}$ grouping combination in a case that descending sorting is performed on the objects in the object set based on a quantity of object elements of the objects in the object set;

the $(N-i)^{th}$ grouping combination comprising a number of (N−i) $(N-i)^{th}$ objects, and the $(N-i)^{th}$ object being the $(N-i)^{th}$ object in the descending sorting in the object set.

4. The method according to claim 1, wherein grouping the plurality of objects in the object set comprises:

performing combination processing on a first batch of objects and a second batch of objects to obtain a first grouping combination;

the first batch of objects comprising a first object in the object set, and the second batch of objects comprising the plurality of objects except for the first object in the object set; and acquiring a second grouping combination, object in one group in the second grouping combination comprising the object set; and the plurality of grouping combinations comprising the first grouping combination and the second grouping combination.

5. The method according to claim 1, wherein obtaining the resource consumption table comprises:

for each object in the resource consumption table, acquiring a resource consumed when the each object is continuously inputted for M times to the target neural network model for processing, M being a natural number; and for the each object in the resource consumption table, determining an average resource consumed in M times of processing by the target neural network model; and for the each object in the resource consumption table, recording the average resource consumed in the resource consumption table.

6. The method according to claim 1, wherein determining the target grouping combination further comprises:

performing following operations on a $j^{th}$ grouping combination of the plurality of grouping combinations, j being a natural number:

querying, based on $S_j$ groups of objects comprised in the $j^{th}$ grouping combination, a consumed resource recorded in the resource consumption table, to obtain a total quantity of $S_j$ consumed resources; and determining a sum of the total quantity of $S_j$ consumed resources as a resource consumed by the $j^{th}$ grouping combination.

7. The method according to claim 6, wherein querying, based on $S_j$ groups of objects comprised in the $j^{th}$ grouping combination, the consumed resource recorded in the resource consumption table comprises:

determining, when a first group of objects in the $S_j$ groups of objects comprises t objects of different quantities of object elements, a first object with a largest quantity of object elements; and determining a total resource consumed when the first object is inputted for t consecutive times to the target neural network model for processing, as a resource consumed by the first group of objects, t being an integer.

8. The method according to claim 6, wherein querying, based on $S_j$ groups of objects comprised in the $j^{th}$ grouping combination, the consumed resource recorded in the resource consumption table comprises:

determining, when the resource consumption table does not record a resource consumed by a second group of objects in the $S_j$ groups of objects, resources that are separately consumed by a third group of objects and a fourth group of objects adjacent to the second group of objects and that are recorded in the resource consumption table; and performing linear interpolation processing between the resources separately consumed by the third group of objects and the fourth group of objects, to obtain the resource consumed by the second group of objects.

9. The method according to claim 1, wherein:

grouping the plurality of objects in the object set to obtain the plurality of grouping combinations comprises:

grouping media information in a media information set to obtain a plurality of grouping combinations; and determining, from the plurality of grouping combinations, a target grouping combination that consumes the minimum resource comprises:

determining, from the plurality of grouping combinations, a target grouping combination that consumes the minimum resource;

the resource consumed by each grouping combination in the plurality of grouping combinations comprising: the sum of resources consumed by inputting in batches a plurality of groups of media information comprised in each grouping combination to the target neural network model for processing; and inputting in batches each group in the target grouping combination to the target neural network model for processing comprises:

inputting in batches a plurality of groups of media information comprised in the target grouping combination to the target neural network model for processing.

10. The method according to claim 9, wherein grouping the media information in the media information set to obtain the plurality of grouping combinations comprises at least one of following:

grouping text information in a text information set to obtain a plurality of text grouping combinations;

grouping image information in a image information set to obtain a plurality of image grouping combinations;

grouping audio information in a audio information set to obtain a plurality of audio grouping combinations; and grouping video information in a video information set to obtain a plurality of video grouping combinations.

11. A device comprising a memory for storing computer instructions and a processor in communication with the memory, wherein, when the processor executes the computer instructions, the processor is configured to cause the device to:

initialize a target neural network model;

receive an object set comprising a plurality of objects of different quantities of object elements, the object set comprising inputs for the target neural network model;

group the plurality of objects in the object set to obtain a plurality of grouping combinations;

determine, based on a resource consumption table, a target grouping combination that consumes a minimum resource from the plurality of grouping combinations, the determining comprising:

obtain the resource consumption table generated based on pre-stored running history of the target neural network model, the resource consumption table storing resources consumed by objects of different quantities of object elements and different batch sizes, and being indexed by quantities of elements and the batch sizes;

acquire, based on the resource consumption table, a resource value corresponding to each group in each grouping combination, wherein the resource value represents a predicted, normalized measure of performance of the target neural network model processing the each group in the each grouping combination, the measure of performance comprising at least one of: processing time, throughput, or another quantifiable metric;

calculate a totalized resource corresponding to the each grouping combination in the plurality of grouping combinations comprising: a sum of the resource corresponding to the each group in the each grouping combination; and select the target grouping combination corresponding to a minimum totalized resource by automatically comparing totalized resources among the plurality of grouping combinations and storing a result in computer memory; and input in batches each group in the target grouping combination to the target neural network model for batch processing, wherein the device produces at least one of a reduction in processing time, an increase in throughput, or a reduction in overall resource consumption.

12. The device according to claim 11, wherein, when the processor is configured to cause the device to group the plurality of objects in the object set, the processor is configured to cause the device to:

acquire an Nth object in the object set and an $(N-i)^{th}$ grouping combination result;

the object set comprising N objects, the $(N-i)^{th}$ grouping combination being a grouping combination that consumes a minimum resource in an $(N-i)^{th}$ object subset, the $(N-i)^{th}$ object subset comprising first N−i objects in the object set, i being an incremental integer, a value range thereof being $1 \leq i \leq N-2$, $N>1$, and N being a positive integer; and perform combination processing on the $(N-i)^{th}$ grouping combination based on an Nth object to obtain N−2 grouping combinations;

the plurality of grouping combinations comprising the N−2 grouping combinations.

13. The device according to claim 12, the processor is configured to further cause the device to:

acquire the $(N-i)^{th}$ grouping combination in a case that descending sorting is performed on the objects in the object set based on a quantity of object elements of the objects in the object set;

the $(N-i)^{th}$ grouping combination comprising a number of (N−i) $(N-i)^{th}$ objects, and the $(N-i)^{th}$ object being the $(N-i)^{th}$ object in the descending sorting in the object set.

14. The device according to claim 11, wherein, when the processor is configured to cause the device to group the plurality of objects in the object set, the processor is configured to cause the device to:

perform combination processing on a first batch of objects and a second batch of objects to obtain a first grouping combination;

the first batch of objects comprising a first object in the object set, and the second batch of objects comprising the plurality of objects except for the first object in the object set; and acquire a second grouping combination, object in one group in the second grouping combination comprising the object set; and the plurality of grouping combinations comprising the first grouping combination and the second grouping combination.

15. The device according to claim 11, wherein, when the processor is configured to obtain the resource consumption table, the processor is configured to further cause the device to:

for each object in the resource consumption table, acquiring a resource consumed when the each object is continuously inputted for M times to the target neural network model for processing, M being a natural number; and for the each object in the resource consumption table, determining an average resource consumed in M times of processing by the target neural network model; and for the each object in the resource consumption table, recording the average resource consumed in the resource consumption table.

16. The device according to claim 11, wherein, when the processor is configured to determine the target group combination, the processor is configured to cause the device to:

perform following operations on a $j^{th}$ grouping combination of the plurality of grouping combinations, j being a natural number:

query, based on $S_j$ groups of objects comprised in the $j^{th}$ grouping combination, a consumed resource recorded in the resource consumption table, to obtain a total quantity of $S_j$ consumed resources; and determine a sum of the total quantity of $S_j$ consumed resources as a resource consumed by the $j^{th}$ grouping combination.

17. The device according to claim 16, wherein, when the processor is configured to cause the device to query, based on $S_j$ groups of objects comprised in the $j^{th}$ grouping combination, the consumed resource recorded in the resource consumption table, the processor is configured to cause the device to:

determining, when a first group of objects in the $S_j$ groups of objects comprises t objects of different quantities of object elements, a first object with a largest quantity of object elements; and determining a total resource consumed when the first object is inputted for t consecutive times to the target neural network model for processing, as a resource consumed by the first group of objects, t being an integer.

18. A non-transitory storage medium for storing computer readable instructions, the computer readable instructions, when executed by a processor, causing the processor to:

initialize a target neural network model;

receive an object set comprising a plurality of objects of different quantities of object elements, the object set comprising inputs for the target neural network model;

group the plurality of objects in the object set to obtain a plurality of grouping combinations;

determine, based on a resource consumption table, a target grouping combination that consumes a minimum resource from the plurality of grouping combinations, the determining comprising:

obtain the resource consumption table generated based on pre-stored running history of the target neural network model, the resource consumption table storing resources consumed by objects of different quantities of object elements and different batch sizes, and being indexed by quantities of elements and the batch sizes;

acquire, based on the resource consumption table, a resource value corresponding to each group in each grouping combination, wherein the resource value represents a predicted, normalized measure of performance of the target neural network model processing the each group in the each grouping combination, the measure of performance comprising at least one of: processing time, throughput, or another quantifiable metric;

calculate a totalized resource corresponding to the each grouping combination in the plurality of grouping combinations comprising: a sum of the resource corresponding to the each group in the each grouping combination; and select the target grouping combination corresponding to a minimum totalized resource by automatically comparing totalized resources among the plurality of grouping combinations and storing a result in computer memory; and input in batches each group in the target grouping combination to the target neural network model for batch processing, wherein the non-transitory storage medium produces at least one of a reduction in processing time, an increase in throughput, or a reduction in overall resource consumption.

* * * * *